United States Patent [19]

Olschewski et al.

[11] 4,399,898

[45] Aug. 23, 1983

[54] DEVICE FOR RELEASABLY SECURING A SHAFT IN A HUB

[75] Inventors: Armin Olschewski, Schweinfurt; Manfred Brandenstein, Eussenheim; Lothar Walter; Heinrich Kunkel, both of Schweinfurt, all of Fed. Rep. of Germany

[73] Assignee: SKF Kugellagerfabriken GmbH, Schweinfurt, Fed. Rep. of Germany

[21] Appl. No.: 204,016

[22] Filed: Nov. 4, 1980

[30] Foreign Application Priority Data

Nov. 6, 1979 [DE] Fed. Rep. of Germany ....... 2944648

[51] Int. Cl.³ .................... F16D 24/14; F16D 25/08; F16B 21/07
[52] U.S. Cl. ................................ 192/98; 192/85 CA; 192/110 B; 192/DIG. 1; 403/322; 403/325
[58] Field of Search ............. 192/85 CA, 98, DIG. 1, 192/110 B; 403/322, 325

[56] References Cited

U.S. PATENT DOCUMENTS

| | | | |
|---|---|---|---|
| 2,089,472 | 8/1937 | Geyer | 192/85 CA |
| 2,345,860 | 4/1944 | Scott-Iversen | 192/85 CA |
| 2,873,153 | 2/1959 | Haynie | 308/187.2 |
| 3,090,257 | 5/1963 | Schjolin et al. | 74/781 |
| 3,260,541 | 7/1966 | Sadler et al. | 403/325 |
| 3,476,445 | 11/1969 | Carlson et al. | 308/6 |
| 3,667,566 | 6/1972 | Hopkins | 403/322 X |
| 3,877,557 | 4/1975 | Maucher | 192/98 |
| 4,228,882 | 10/1980 | Huber et al. | 192/110 B |
| 4,271,950 | 6/1981 | Kolb et al. | 192/98 |

FOREIGN PATENT DOCUMENTS

| | | |
|---|---|---|
| 2444661 | 1/1976 | Fed. Rep. of Germany . |
| 7809284 | 8/1978 | Fed. Rep. of Germany . |
| 2296118 | 7/1976 | France . |
| 1511290 | 5/1978 | United Kingdom . |
| 1559399 | 1/1980 | United Kingdom . |
| 1571477 | 7/1980 | United Kingdom . |
| 2062799 | 5/1981 | United Kingdom . |

OTHER PUBLICATIONS

Winfred M. Berg, Inc. Catalog, Cat.-A6, copyright 1975, pp. 201–203, External and Internal Retainer Rings.

Primary Examiner—Rodney H. Bonck
Attorney, Agent, or Firm—Daniel M. Rosen

[57] ABSTRACT

The present invention is a device for securing a shaft or the like in a hub, wherein an annular groove is provided on the shaft or in the hub to accommodate an elastic securing ring of round cross-section. A shoulder is provided on the hub or shaft radially facing the annular groove and the hub or shaft has an adjusting member displaceable in axial direction with a conical face axially facing the shoulder. This face together with the shoulder forms an annular recess widening towards the opening of the groove. The floor of the annular groove on the side of the adjusting member is at a radial distance from the shaft or hub at least as great as the thickness of the securing ring.

11 Claims, 8 Drawing Figures

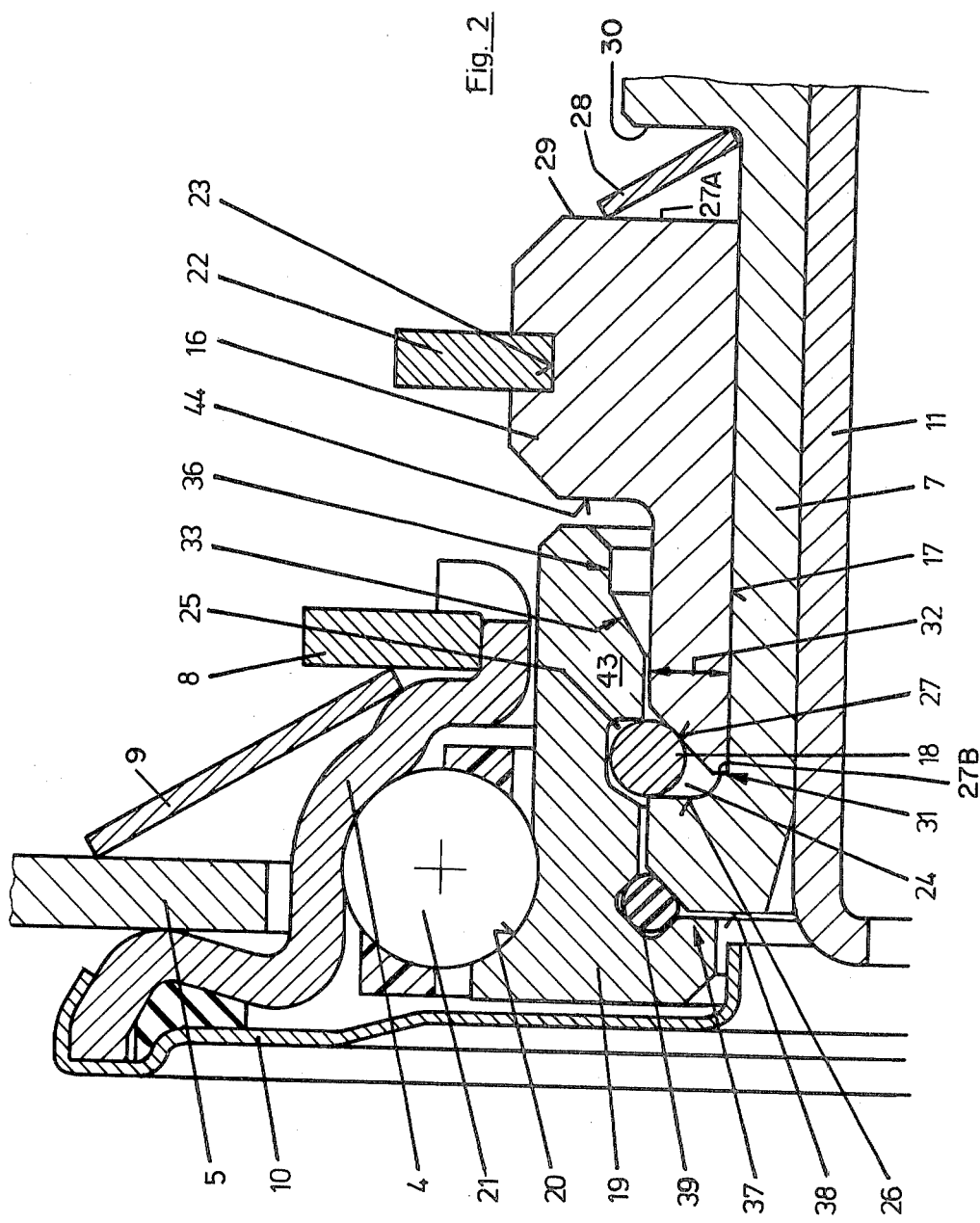

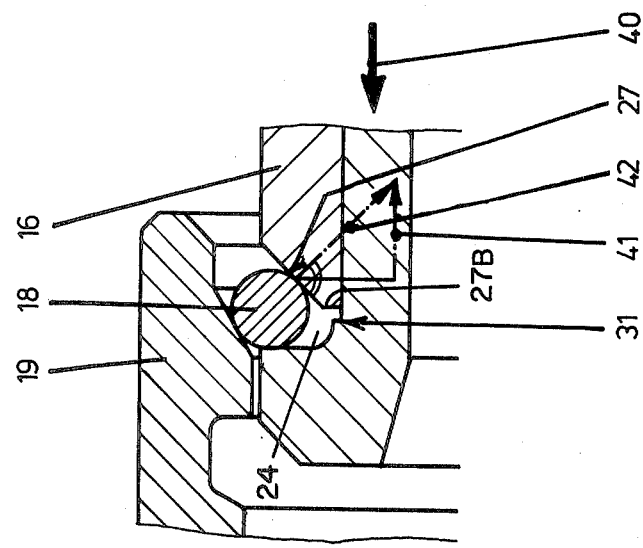
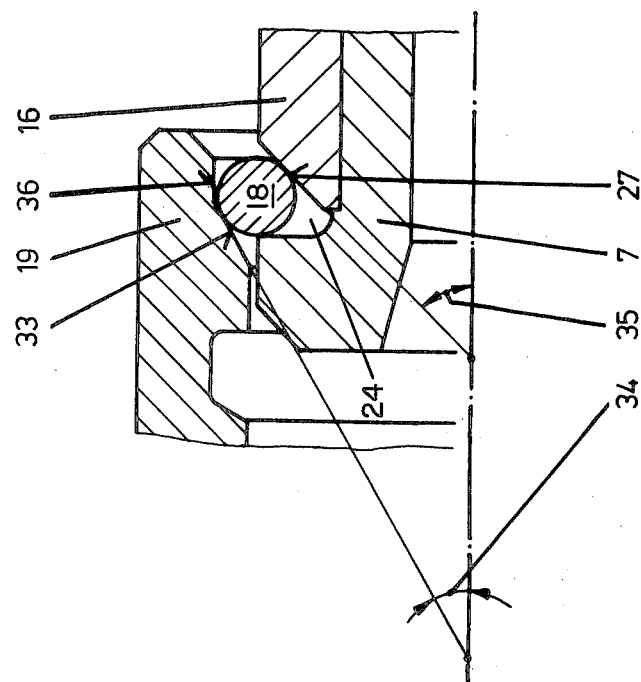

a
DEVICE FOR RELEASABLY SECURING A SHAFT IN A HUB

BACKGROUND OF THE INVENTION

This invention is in the field of devices for releasably securing a shaft in a hub and particularly devices for disengaging clutches. In one known device an adjusting member is adjusted axially by means of screws or nuts (German Design Pat. No. 7,809,284). In this device, threads must be machined in the shaft, adding to the cost of fabrication. Also, assembly of the known device is troublesome because the axial adjustment of the adjusting member can be accomplished only with special tools, such as wrenches. Operation of these tools requires clear space near the device, not always available in machinery of compact design. Screwing-in and adjusting the adjusting member too far may injuriously overload and pinch the securing ring. On the other hand, insufficient adjustment will leave an undesirable clearance between hub and shaft. Such clearance is unacceptable, especially in cases where power or motion is to be transmitted between shaft and hub (for example in disengaging elements for clutches).

It is also to be borne in mind that in such a known device, the screws or the like required to adjust the adjusting member must be secured against accidental loosening. For this reason also, both manufacture and assembly of the known device are comparatively costly.

The object of the invention is to provide a device for securing a shaft or the like in a hub in which the securing of the shaft in the hub can be accomplished simply, quickly and dependably in comparatively limited space. The device is moreover to be economical to manufacture.

SUMMARY OF THE INVENTION

With the help of the device according to the invention, the shaft is simply secured and locked in the hub by axial insertion. When the shaft is thus inserted, an elastic securing ring is pushed axially against a shoulder on the shaft or hub, and then radially into the annular groove of the hub or shaft, as an adjusting member is displaced against the spring member. Upon further insertion of the shaft, the securing ring comes into line with an annular groove of the shaft or hub. The ring is then pressed by the spring member acting on the adjusting member by way of the face of the adjusting member, radially outward and into snug contact in the annular groove. The connection is thus made without any tools for driving threaded elements, which require considerable space for use and are not always available in motor vehicles of compact design. When inserting the shaft in the hub, no special rotary placement of the shaft in the hub need be observed. For this reason also the securing of the shaft in the hub is trouble-free and can be performed by assemblers without special training.

Furthermore, the device according to the invention provides a firm, rigid connection between shaft and hub, and is thus secured against accidental loosening, without the aid of additional locking members such as screws.

Various advantageous refinements or embodiments of the invention are described as follows. In one embodiment a simple spring member, for example spring washers, may be built into the device. Another embodiment has the advantage that the assembling forces required to insert the shaft in the hub may be kept small, and that the shaft or hub, whichever bears the adjusting member, together with the securing ring and spring member, forms a compact structural unit. This advantage is especially enhanced by a further modification whereby the longitudinally parted sleeve of the annular adjusting member is retained without play in the radial recess of the hub or shaft, so that it cannot drop out of the radial recess. The securing ring by virtue of its inherent elasticity strains against the conical face of the sleeve and presses the sleeve radially towards the base of the recess and axially against the spring member.

The advantage of still another embodiment is that the adjusting member may readily be grasped by its working surface by suitable means, for example hooks, and simply thrust into the hub or onto the shaft against the adjusting force of the spring member. At the same time, the annular recess, widening outward, is enlarged, so that the securing ring by virtue of its elasticity will spring radially out of the annular groove into the annular recess, undoing the geometrical lock between hub and shaft. As a result, the shaft can be pulled out of the hub simultaneously with the displacement of the adjusting member.

In a further embodiment the travel of the adjusting member in the hub or on the shaft towards the securing ring is limited, thus preventing injurious overload or pinching of the securing ring in the annular groove. In order that the shaft shall not be thrust too far into the hub when secured, the hub or shaft, according to another embodiment, is axially secured and retained by a stop shoulder on the shaft or hub at the end of the proper insertion travel.

In an additional modification severe concussions in assembly or operation are cushioned by the ring of elastically compressible material, for example rubber, thus avoiding injury or wear of the device. A further modification is especially advantageous in the case of motor vehicle clutches, with respect to security of the connection between hub and shaft, and also with respect to simplicity of assembly and economy of manufacture of the device.

These advantages are supplemented by a still further modification which provides an extremely compact structural unit, wherein the shaft or hub is combined with the hydraulic actuating system, and is readily replaceable. The apparatus according to the invention will be further illustrated in the following description of three embodiments represented in the drawings by way of example.

DESCRIPTION OF THE DRAWINGS AND PREFERRED EMBODIMENTS

FIG. 2 shows an enlarged view of the portion marked A in FIG. 1;

Figure 1:
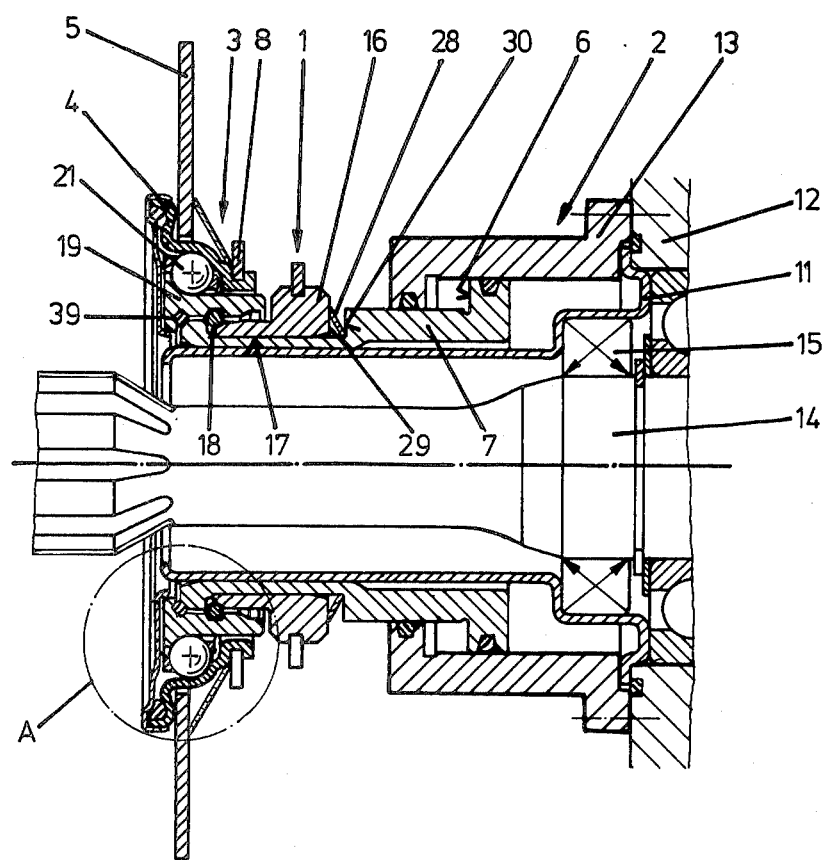
FIG. 1 shows a longitudinal section of a device installed in a clutch disengaging means.
Figure 4:
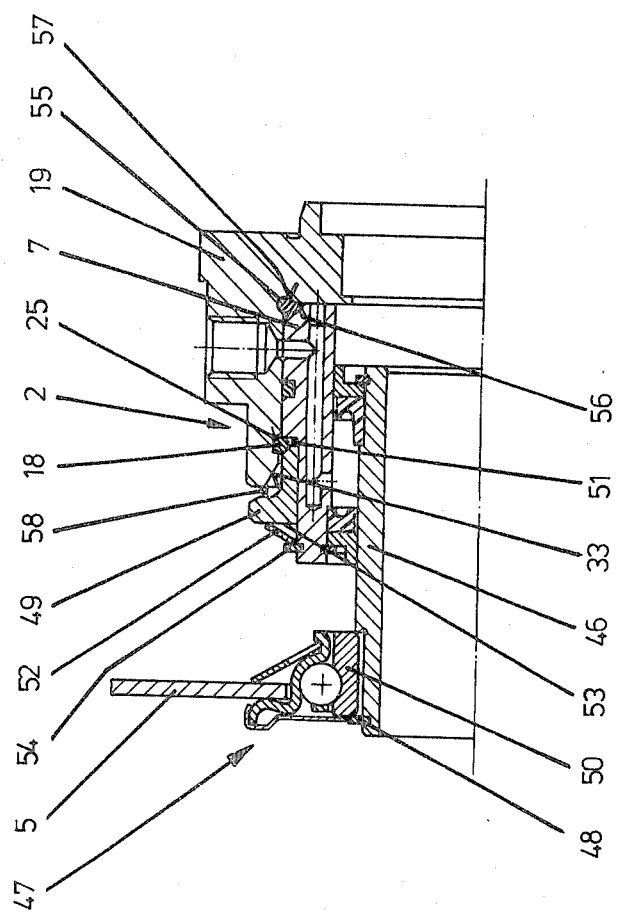
Figure 5:
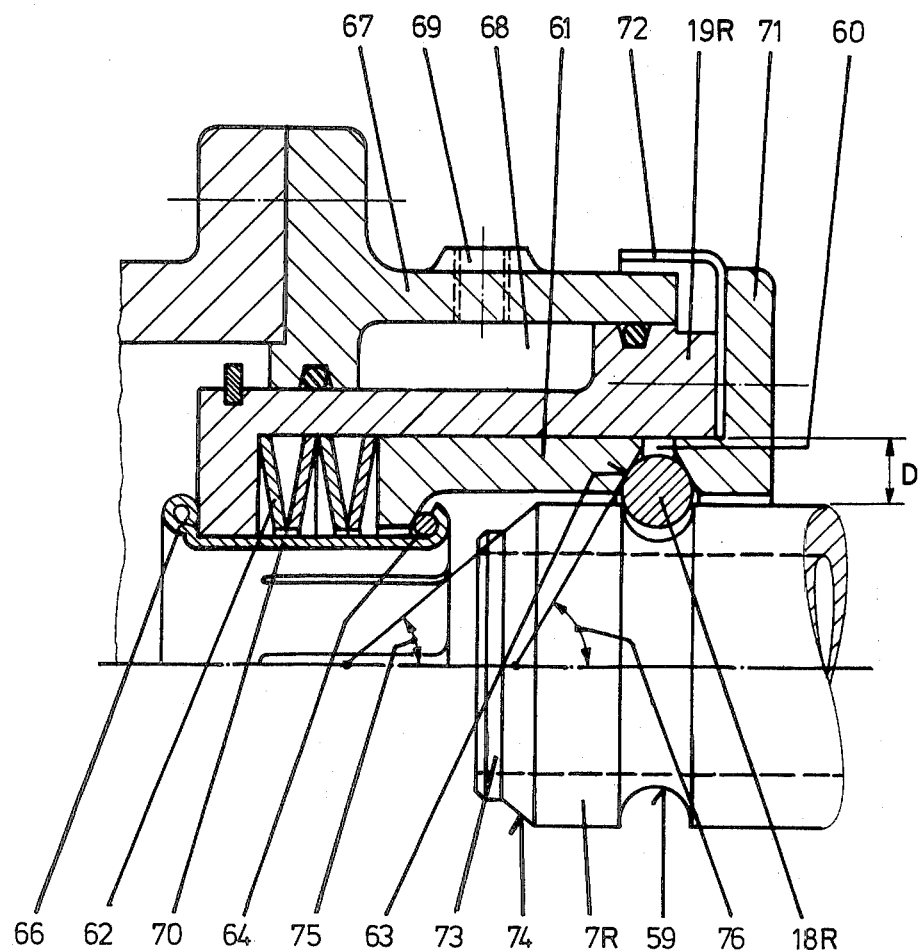

FIGS. 3a, 3b, 3c and 3d schematically represent the relative positions of shaft, hub, adjusting member and securing ring in the course of axial insertion of the shaft into the hub in the device shown in FIGS. 1 and 2;

FIG. 4 shows a partial longitudinal section of a second embodiment; and,

FIG. 5 shows a partial longitudinal section of a third embodiment.

The device 1 represented in FIGS. 1 and 2 is installed in a clutch disengaging means and consists of hydraulic actuating means 2 and a disengaging bearing 3.

The rotating outer race member 4 of the bearing 3 takes hold in known manner behind the diaphragm parts 5 of the clutch (not shown) and moves in the same axial direction to disengage the clutch. This disengaging motion is produced by hydraulic action on the step face 6 of the hollow shaft 7 and corresponding axial displacement of this shaft from left to right in the drawings.

An expansion ring 8 clips the outer race member 4 to diaphragm parts 5 by means of spring washer 9 in a known manner. A cover plate 10 closes off the bearing on the side facing the clutch (not shown).

A guide sleeve 11 is fixed between the transmission housing 12 and the outer sleeve 13 of the actuating means 2, accommodating the drive shaft 14 in its interior. A packing ring 15 is set into the guide sleeve 11, sliding on the rotating drive shaft 14. On the periphery of the guide sleeve 11, the hollow shaft 7 is situated and is guided to be axially slidable thereon.

The hollow shaft 7 constitutes a stepped inner sleeve of the hydraulic actuating means 2; it co-operates hydraulically with the stepped outer sleeve 13 in a known manner, thus representing an integral part of the actuating means 2.

The device 1 consists of the hollow shaft 7, an adjusting member here comprising a longitudinally parted or divided sleeve 16 set axially displaceable in the radial recess 17 of shaft 7, an elastic securing ring 18 of round cross-section, and the hub 19, carrying the race 20 for the rolling elements 21 or the disengaging bearing 3. The hub 19 thus constitutes the stationary race member of the bearing 3. An expansion ring 22 snapped into a matching groove 23 in the periphery of the longitudinal parted or split sleeve 16 holds the sleeve 16 together.

The securing ring 18 shown is made of spring steel to lock into an annular recess 24, radially compressible and expandible securing rings being known in the prior art, i.e., circumferentially split metal snap or retainer rings or spring rings as evident in U.S. Pat. No. 3,090,257, FIG. 2, ring 68; U.S. Pat. No. 3,476,445, FIG. 1, ring 39 in groove 40; U.S. Pat. No. 2,873,153, FIG. 1, spring 23; the Winfred M. Berg, Inc. Catalog, CAT.-A6, copyright 1975, pages 201 and 203, external and internal retainer rings; or ring 6 in West German Pat. No. DE-GM 78-09-284, or an o-ring 3 of West Germany Pat. No. DE-OS 24-44-661. This recess 24, owing to the shoulder 26 on shaft 7 radially directed toward the annular groove 25 in the bore of the hub 19, and the conical face 27 of sleeve 16 axially opposed to the same, is so shaped as to widen towards the aperture of the groove.

A compressed spring washer 28 is installed as a spring member between the terminal face 27A of sleeve 16 axially opposed to face 27, and the shoulder 30 of shaft 7. This spring washer 28 automatically adjusts the sleeve 16 with a certain force against the securing ring 18. As a result, the face 27 is always in contact with the securing ring 18 which is urged radially inward, thus ensuring snug retention of the securing ring 18 in the annular recess 24.

The bottom of the annular recess 24 has a stop 31 axially opposed to the face 27B of sleeve 16. Furthermore, the bottom of the annular recess 24, on the side of the adjusting member formed by the sleeve 16, is at a radial distance 32 from the bore surface of the hub, at least as great as the thickness of the securing ring 18.

Just axially adjacent to the annular groove 25, there is a conical shoulder 33 in the bore of the hub 19, pointing axially opposed to the direction of adjustment of the sleeve 16. This shoulder 33, as shown clearly in FIG. 3a, has a smaller vertex angle 34 than the vertex angle 35 of the face 27 of sleeve 16. Adjoining this shoulder 33, a terminal cylindrical portion 36 is provided in the bore of hub 19, serving to center the securing ring 18 when the shaft 7 is inserted into hub 19.

The hub 19 also has a stop shoulder 37 facing axially towards the securing ring 18. This stop shoulder 37 limits the motion of insertion of shaft 7 in hub 19, being axially opposed to the terminal offset 38 of shaft 7 and thus preventing excessive axial penetration of the shaft.

Between offset 38 and stop shoulder 37, a ring 39 of elastically compressible material, for example rubber, is installed, to cushion axially directed impact loads, and likewise providing an axial pre-stress between shaft 7 and hub 19, so as to provide a firm but cushioning connection by way of the securing ring 18.

Prior to securing shaft 7 in hub 19, the shaft 7 is assembled with the outer sleeve 13 of the hydraulic actuating means 2, sleeve 16, expansion ring 22 and securing ring 18, thus forming a self-retaining, readily transportable sub-assembly. This subassembly may be secured in a simple manner in the hub 19 of the disengaging bearing 3 associated with the clutch (not shown).

Figure 3C:
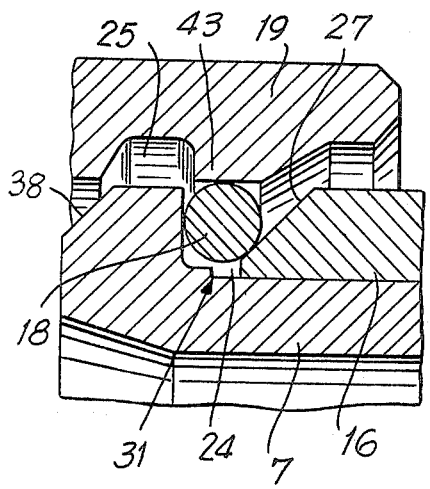

When being secured in the hub 19, the shaft 7 is thrust into the bore of hub 19 axially until the securing ring 18 rests against the conical shoulder 33 as seen in FIG. 3a. Upon further insertion of the shaft 7 (from right to left in the direction of the arrow 40 in FIG. 3b), the elastic securing ring 18 is forced radially inward into the annular recess 24. At the same time, an axial component 41 of the force of reaction 42 acting perpendicularly on the conical face 27 is exerted on sleeve 16, displacing it on shaft 7 against the pressure of the spring washer 28. Owing to this displacement, face 27B of sleeve 16 is moved from contacting the axially opposed stop shoulder 31 of shaft 7, and the annular recess 24 is widened to receive the securing ring 18 which moves radially inward. FIG. 3c shows the securing ring having arrived under the shoulder 43 of hub 19 and thus pressed even farther into the annular recess 24.

Figure 3D:
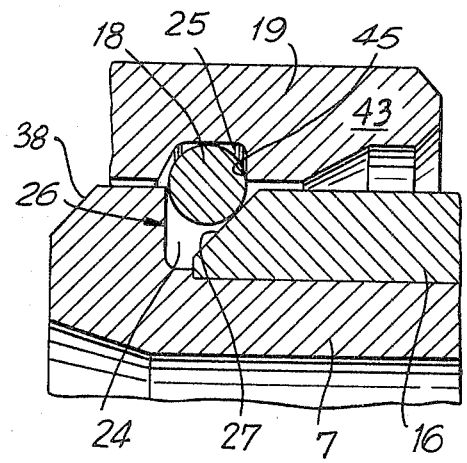

Upon further axial insertion of shaft 7 into hub 19, the securing ring 18, as may be seen in FIG. 3d, passes under the shoulder 43 and is pressed radially outward into the groove or recess 25 by the face 27 driven by the spring washer 28. At the same time the annular recess 24 is narrowed, because the sleeve 16 is thrust back axially on shaft 7 towards the securing ring 18 by the spring washer 28 with automatic axial adjustment. The securing ring 18 will thus rest without clearance on the bottom and/or sides of the annular groove 25. At the same time, the chamfered terminal offset 38 of shaft 7 presses against the elastically compressible ring 39, so that the motion of insertion of shaft 7 is cushioned, preventing overload on the securing ring 18 during assembly. Besides, the pre-stress of the ring 39 tends to lock the securing ring 16 in the annular groove 25.

The sleeve 16 is provided with a working surface 44 to be grasped with a tool (screw driver or the like) so that the sleeve may be displaced axially against the force of the spring washer 28 to loosen the device (FIG. 2). This widens the annular recess 24. The securing ring 18, straining radially inward, will thus force its way into the annular recess 24, coming out of the annular groove 25, and release the hub 19. The shaft 7 can then be pulled axially out of the hub 19 in the direction from left to right in the drawing.

The disengaging means 2, represented in FIG. 1 of the drawing, moves the hollow shaft 7 to the right, this shaft as the inner stepped sleeve, being a part of the hydraulic actuating means for disengaging the clutch. The corresponding disengaging forces act by way of the shoulder 26 of shaft 7 and the securing ring 18 on the wall 45 of the annular groove 25 (FIG. 3d). In the present instance, the shoulder 26 and the wall 45 are radial plane surfaces, and accordingly can transmit fairly high axial thrusts (no radial component). In the course of such transmission of force, the securing ring 18 is neither compressed nor expanded radially. Owing to this firm connection of shaft 7 and hub 19, the device as shown in FIGS. 1, 2, 3a–3d is especially suitable for heavy-duty clutches in motor vehicles.

FIG. 4 shows a modification or device in which the shaft of the device is formed by the outer step sleeve 7M and the hub by the flanged housing 19M of a hydraulic actuating means 2M. The actuating means 2M has an inner step sleeve 46 on which the disengaging bearing 47 is retained, self-centering on an expansion ring shoulder 48. The bearing 47 acts, as in the embodiment previously described by way of example, on the diaphragm parts 5M of a clutch (not shown).

A one-piece flanged ring 49 serving as adjusting member is arranged axially displaceable on shaft 7M. Further the shaft 7M is connected to the stationary self-centering inner race member 50 of the disengaging bearing 47 by way of the inner step sleeve 46 hydraulically coupled thereto, on which the inner race member 50 is, radially movable within narrow limits, of the disengaging bearing 47. The automatic axial adjustment of the flanged ring 49 takes place against the actuating force acting on shaft 7M, directed from left to right in the drawing of FIG. 4 (the disengaging forces pulling on the bearing 47). An elastic securing ring 18M of round cross-section is seated in the annular groove 25M of hub 19M. On shaft 7M, much as in the case previously described, an annular recess 51 is formed, widening towards the groove openings. The bottom of this recess 51, on the side of flanged ring 49, is at a radial distance from shaft 7M at least as great as the thickness of the securing ring 18M. The one-piece flanged ring 49 is adjusted automatically against the securing ring 18M by a spring washer 52 as spring member. The spring washer 52 pressing against the terminal surface 53 of the flanged ring 49 is axially retained on shaft 7M by a shoulder 54 formed by an expansion ring.

The securing ring 18M is so arranged in the annular recess 51 that upon axial insertion of shaft 7M in hub 19M, it comes into contact with the conical shoulder 33M of hub 19M.

The securing of shaft 7M with disengaging means 2 and disengaging bearing 47 integrated in the same unit is accomplished by simply inserting the shaft 7M axially in hub 19M from left to right. In so doing, just as in the case previously described, a firm locking of shaft 7M in hub 19M without play is achieved, the securing ring 18M making its way into the annular groove 25M. The assembling forces are cushioned by the elastic ring 55 arranged between the terminal offset 56 of shaft 7M and the stop shoulder 57 of the flanged housing 19M serving as hub.

The shaft 7M is pulled out of the flanged housing 19M by grasping the flanged ring 49 by its working surface 58 and axially displacing it on shaft 7M against spring washer 52. The securing ring 18M straining radially inward, will then make its way into the annular recess and so release the hub 19M.

FIG. 5 shows another modified device in which the annular groove 59 is arranged partially in the shaft 7R and partially in the annular recess 60, widening towards the groove opening in the hub 19R. The adjusting member consists of a one-piece sleeve 61 displaceably arranged in the hub 19R. Associated spring members are spring washers 62 automatically adjusting sleeve 61 by its conical face 63 against the securing ring 18R. The adjusting motion of sleeve 61 is cushioned by a round cord ring 64 of elastically compressible rubber. The ring 64 is seated on an assembly sleeve 65 having a working surface (rolled) 66 for grasping and axially displacing the sleeve 61 in the bore of hub 19R against the adjusting force of spring washers 62.

The hub 19R takes the form of an inner step sleeve, and so constitutes part of a hydraulic actuating means. The outer step sleeve 67 of this actuating means cooperates with the hub 19R in a known manner to generate a hydraulic actuating force. Between hub 19R and step sleeve 67, a chamber 68 is formed, acted upon by a hydraulic medium, in this case a suction fluid, air or oil. The hydraulic medium is supplied to chamber 68 through the opening 69 in the outer step sleeve 67.

The hydraulic actuating means and the hub 19R with built-in sleeve 51, spring washers 62 and securing ring 64 form a readily transportable, compact unit. This unit is held together by the assembly sleeve 70, capable of being snapped in axially from left to right in FIG. 5, with cord ring 64 and cover plate 71 with sheet metal interlay 72 screwed to hub 19R.

When securing the shaft 7R in hub 19R, the shaft 7R is pushed into the bore of the assembled hub 19R from right to left in the drawing (FIG. 5), so that its centering surface 73 will be located at the securing ring 18R. Thus the conical shoulder 74 of shaft 7R comes to rest against the securing ring 18R, which in the present case is arranged to slip radially outward into the annular groove 60.

Sleeve 61, when securing shaft 7R in hub 19R, is again displaced axially against the force of spring washers 62, widening the annular recess 60. For this purpose, the conical shoulder 74 of shaft 7R has a smaller vertex angle 75 than the vertex angle 76 of the face of sleeve 61.

The bottom of the annular recess 60, on the side of sleeve 61, is at a radial distance D from shaft 7R at least as great as the thickness of the securing ring 18R.

The securing ring 18R, upon further insertion of shaft 7R in hub 19R, encounters the cylindrical surface 75 of shaft 7R, arranged immediately alongside the annular groove 59. Finally the securing ring 18R will snap into the annular groove 59. At the same time, the ring 18R is automatically pushed into the annular groove 59 by spring washers 62 by way of face 63.

The shaft 7R may be released by axially slipping the assembly sleeve 70 over the working surface 66 against the action of the spring washers 62. This moves the fastening ring 18R, straining radially outward, into the annular recess 60, thus clearing the annular groove 59. Then the shaft 7R may be pulled out of the hub 19R from left to right in the drawing.

The shaft 7R may be connected to the stationary race member of a disengaging bearing (not shown), to wit in such manner that the axial adjustment of sleeve 61 takes place against the axial actuating force acting on shaft 7R. The actuating force i.e. suction force, is thus transmitted by shaft 7R by way of the securing ring 18R to the cover plate 71 fixedly connected to hub 19R.

The device according to the invention has the great advantage that the securing of the shaft in the hub takes place simply, quickly and dependably, and can be accomplished within a comparatively confined space.

What is claimed is:

1. In a device for securing a shaft in a hub, wherein the hub has an annular groove in its bore, an annular recess on the shaft radially faces the groove and has a radially directed shoulder, an adjusting member is axially moveable on the shaft in said recess, the adjusting member having a conical face directed toward the shoulder, whereby the shoulder and conical face define an adjustable recess that widens radially outwardly, and an elastic securing ring of round cross-section received in said groove and adjustable recess, the floor of the adjustable recess at the axial end thereof away from said shoulder being spaced from the bore of the hub a distance at least equal to the radial thickness of said securing ring; the improvement wherein said hub has a conical shoulder facing in the direction opposite to the axial adjustment of said adjusting member, said conical shoulder being immediately adjacent said annular groove, said conical shoulder having a smaller vertex angle than the vertex angle of the conical face of the adjusting member, and a spring member on said shaft for the automatic axial adjustment of said adjusting member, for urging said conical face of said adjusting member against said securing ring, said securing ring being positioned to contact said conical shoulder when said shaft is thrust axially into said hub in the assembly of said shaft therein.

2. A device according to claim 1, wherein the spring member is installed under compressive stress between a terminal surface of the adjusting member facing axially opposite said conical face and a second shoulder of the recess.

3. A device according to claim 1 wherein the securing ring comprises a metal expansion ring clipped into the annular groove.

4. A device according to claim 1 wherein the adjusting member comprises a sleeve parted lengthwise and inserted in said recess of the shaft.

5. A device according to claim 1 wherein the adjusting member is provided with a working surface which is engagable, for axial displacement of said adjusting member against the adjusting force of said spring member.

6. A device according to claim 1 wherein said shaft carrying the adjusting member has a step axially facing the face of the adjusting member to limit the axial adjustment movement of the adjusting member on the shaft.

7. A device according to claim 1 wherein said shaft carrying the adjusting member, to limit the relative axial motion of insertion of the shaft and hub, has an offset facing a shoulder stop of the associated hub.

8. A device according to claim 7, comprises a ring of elastically compressible material installed between said offset and said stop shoulder.

9. A device according to claim 1 where a disengaging means for clutches has a disengaging bearing transmitting an axial actuating force, with a rotating race member and a stationary race member, the improvement wherein said shaft carrying the adjusting member is associated with the stationary race member, the device being arranged with the automatic axial adjustment of the adjusting member opposed to the direction of the actuating force acting on the shaft.

10. A device according to claim 9, wherein the shaft carrying the adjusting member comprises part of a hydraulic actuating system.

11. In a device for securing a shaft in a hub, wherein the shaft has an annular groove in its outer surface, an annular recess in the bore of the hub radially faces the groove and has a radially directed shoulder, an adjusting member is axially moveable on the hub in said recess, the adjusting member having a conical face directed toward the shoulder, whereby the shoulder and conical face define an adjustable recess that widens radially inwardly, and an elastic securing ring having a round cross-section received in said groove in said adjustable recess, the floor of the adjustable recess at tha axial end thereof away from said shoulder being spaced from said shaft a distance at least equal to the radial thickness of said securing ring; the improvement wherein said shaft has the conical shoulder facing opposite the direction of axial adjustment of said adjusting member, said conical shoulder being immediately adjacent said annular groove, said conical shoulder having a smaller vertex angle than the vertex angle of the conical face of the adjusting member, and a spring member on the hub for automatic axial adjustment to urge said conical face of the adjusting member against the securing ring, said spring member extending between said adjusting member and a second shoulder in said recess, whereby said securing ring contacts said conical shoulder when the shaft is thrust axially into the hub.

* * * * *